Jan. 6, 1953     G. A. LYON     2,624,627
WHEEL COVER
Filed Sept. 14, 1948
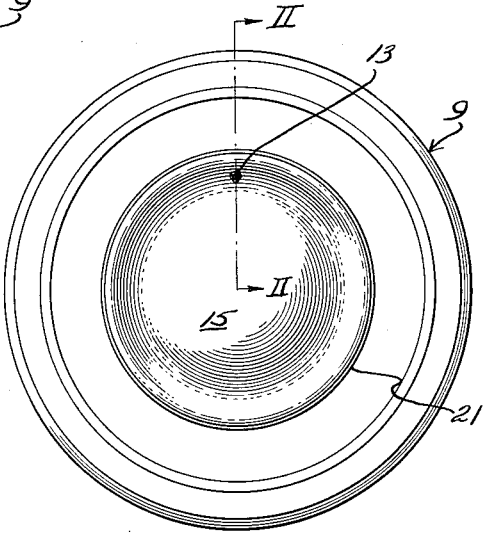
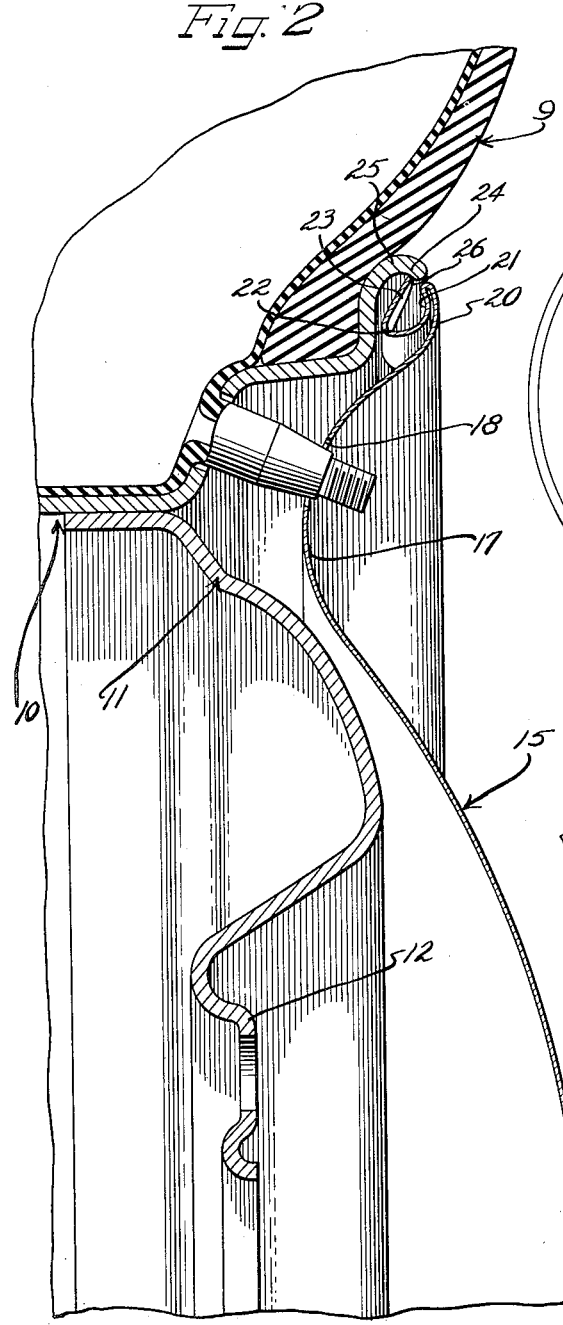
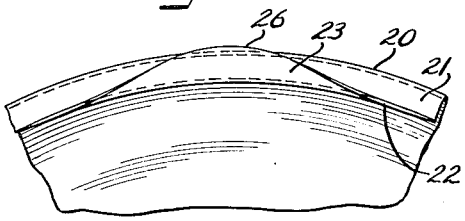
Inventor
George Albert Lyon
by [signature] Attys Patented Jan. 6, 1953

2,624,627

UNITED STATES PATENT OFFICE 2,624,627

WHEEL COVER

George Albert Lyon, Detroit, Mich.

Application September 14, 1948, Serial No. 49,237

5 Claims. (Cl. 301—37)

This invention relates to automobile wheel trim and more particularly to retaining means therefor.

An object of this invention is to provide novel and simplified retaining means for automobile wheel trim such, for example, as a wheel disk, and which lends itself to economical fabrication from the corners of a blank from which the disk is stamped.

Another object of this invention is to provide a wheel cover with retaining means on its outer peripheral portion concealed thereby but readily engageable with a flange of the tire rim.

In accordance with the general features of this invention there is provided for use with an automobile wheel of the type including a wheel body and a multi-flanged tire rim, a wheel trim for disposition on an outer side of a wheel comprising a circular member having an underturned outer peripheral edge terminating in a plurality of concealed resilient fingers, each of which forms with the edge a U-shaped configuration, the rear leg of the U being resiliently yieldable and having its outermost extremity positioned for snap-on resilient retaining engagement with an outer flange of the tire rim.

Other objects and features of this invention will more fully appear from the following detailed description taken in connection with the accompanying drawing which illustrates several embodiments thereof and in which:

Figure 1 is a side view of a wheel structure to which my novel wheel trim or cover is shown applied;

Figure 2 is an enlarged fragmentary cross-sectional view taken of substantially the line II—II of Figure 1 looking in the direction indicated by the arrows; and Figure 3 is a fragmentary rear view of a portion of the outer edge of the trim showing one of the retaining fingers.

As shown on the drawing:

My present invention is designed primarily for use with a conventional automobile wheel of the type including the usual pneumatic tire and tube assembly 9 supported upon a multi-flanged drop center type of tire rim 10 which is in turn carried by a so-called wheel body or spider 11. The wheel body 11 comprises a dished stamping and includes the customary central wheel bolt-on flange 12 by which the wheel is attached to a part on an axle of an automobile.

Projecting from the tire and tube assembly 9 and through one of the flanges of the rim 10 is a conventional valve stem 13 which, of course, must be accessible for the purpose of inflating or deflating the tire.

The reference character 15 designates generally a wheel trim or circular cover member embodying the features of this invention. While I have shown this trim in the form of a so-called full disk, it is, of course, clear that the central or crown portion could be cut out leaving a trim ring without departing from the spirit of this invention. In that event, of course, a separate detachable hub cap could be used in the usual way with the body part 11 over the bolt-on flange 12.

The wheel cover 15 comprises a stamping made from any suitable sheet metal such, for example, as steel sheet, and is generally of a smooth relatively symmetrical convex, concave cross-sectional shape such as to provide the outer side of a wheel with a pleasing appearance. It includes a central crown portion 16 and dished outer portion 17 terminating in a curved outer margin 20. The dished portion 17 has an aperture 18 through which the valve stem 13 can extend.

My invention is particularly concerned with the outer portion 20 of the cover and more particularly with the provision of the same with snap-on retaining means for holding the cover on the wheel over the outer side of the same.

The curved outer portion 20 includes an underturned portion 21 the edge of which terminates at 22 in a series of equidistantly spaced resilient fingers 23. These fingers form, with the underturned portion 21, a U-shaped configuration so that the portion 21 in reality comprises one leg and the bottom of the U and the fingers 23 comprise the other leg of the same. The bottom of the U is preferably of arcuate cross section to juncture with the fingers so as to enhance the resiliency of the finger structure. Each of the fingers 23 extend radially and axially outwardly from the axis of the wheel and has its extremity positioned for tight gripping engagement at 24 with a curved outer marginal flange 25 of the tire rim 10. As best shown in Figure 3, each of the fingers is generally of a teat-like configuration terminating in a peak 26 which is the contacting point of the finger. In other words, each finger is symmetrically curved from the peak on each side of the same to the edge 22.

In practice I contemplate stamping my wheel cover 15 from strip steel and using the corners which would otherwise be scrap for making the fingers 23. Since the ensuing circular cover 15 would leave four scrap corners, it follows that the fingers 23, made from such corners, would be equidistantly spaced about the circumference of the cover.

Also, attention is directed to the fact that the outermost peripheral edge of the cover 15 is spaced slightly from the outer rim flange 25 so that the edge of a pry-off tool can be inserted in this space for the purpose of forcibly ejecting the cover from the wheel when it is desired to get to the bolt-on flange 12.

In the application of the cover to the wheel, the hole 18 is first lined up with the valve stem 13 and then the cover is pressed axially inwardly toward the wheel. In this movement the fingers 23 will contact the outer flange 25 and slightly yield as they slide along the inner surface of the same. However, upon release of pressure on the cover, they will tightly grip this rim flange surface so as to hold the cover on the wheel. Any slight tendency for the cover to become dislodged outwardly from the wheel will be resisted by these yieldable fingers since they will, in response thereto, tend to grip more tightly the rim flange. However, they may be disengaged by the application of substantial pry-off force to the outer cover edge in which event each of the U-shaped configurations, including the finger, bodily yields radially inwardly toward the main body of the cover thus permitting the end of the finger to ride free of the cooperating edge of the rim flange.

I claim as my invention:

1. As an article of manufacture, a wheel trim for an outer side of a wheel comprising a circular member having an underturned outer peripheral edge terminating in four equidistantly spaced retaining fingers at the corners of a blank from which the trim is made, each of said fingers forming with said edge a U-shaped configuration in a radial direction with a free leg rearwardly, and which leg has a free extremity extending generally radially and axially outwardly for gripping engagement with an outer marginal flange of the wheel tire rim, each of said fingers comprising a rounded teat-like portion with the gripping portion at the peak of the same.

2. In a wheel structure including a body part and a multi-flanged tire rim having an outer marginal flange of curved cross section, a wheel trim therefor of circular form and including a body having its outer margin turned under to provide a generally radially inwardly extending marginal flange, the juncture of said flange with the body lying closely adjacent to but in spaced relation to the edge extremity of said tire rim flange, said underturned flange having at spaced intervals thereon portions curving radially and axially inwardly and then radially outwardly and terminating in radially and axially outwardly extending fingers having the edges thereof curved in plan and with the gripping portions thereof at the peak of the same, said gripping portions extending beyond the extremity defined by said juncture and engaging in edgewise gripping relation with the radially inner side of said curved tire rim flange to retain the trim on the wheel, said portions of said underturned flange including the finger extensions being resiliently deflectable for applying the trim by pushing the same axially inward into position and for releasing the cover when a pry-off tool is applied between the juncture extremity of the trim and the edge of the tire rim flange and manipulated to eject the trim from the wheel.

3. As an article of manufacture, a wheel trim for an outer side of a vehicle wheel, said trim comprising a circular member having at the inner side of the outer peripheral edge a plurality of spaced retaining fingers, each of said fingers being of substantially U-shaped configuration in a radial direction with a free leg rearwardly, and which leg has a free extremity extending generally radially and axially outwardly for gripping engagement with an outer marginal flange of the wheel tire rim, each of said fingers comprising a rounded edge when viewed in plan and with the gripping portion of the edge at the peak of the same.

4. As an article of manufacture, a wheel trim for an outer side of a vehicle wheel, said trim comprising a circular member having at the inner side of the outer peripheral edge a plurality of spaced retaining fingers, each of said fingers being of substantially U-shaped configuration in a radial direction with a free leg rearwardly, and which leg has a free extremity extending generally radially and axially outwardly for gripping engagement with an outer marginal flange of the wheel tire rim, each of said fingers tapering widely from the tip thereof to juncture with the circular member and being thus of substantially increasing resilient tension from the tip to said juncture.

5. As an article of manufacture, a wheel trim for an outer side of a vehicle wheel, said trim comprising a circular member having at the inner side of the outer peripheral edge a plurality of spaced retaining fingers, each of said fingers being of substantially U-shaped configuration in a radial direction with a free leg rearwardly, and which leg has a free extremity extending generally radially and axially outwardly for gripping engagement with an outer marginal flange of the wheel tire rim, each of said fingers comprising a body portion joining said free leg with the circular member, and said body portion being of curved radial section, said free leg being substantially straight.

GEORGE ALBERT LYON.

REFERENCES CITED

The following references are of record in the file of this patent:

UNITED STATES PATENTS

| Number | Name | Date |
|---|---|---|
| 1,944,658 | Griffith | Jan. 23, 1934 |
| 1,948,273 | Lyon | Feb. 20, 1934 |
| 2,368,228 | Lyon | Jan. 30, 1945 |
| 2,404,389 | Lyon | July 23, 1946 |